United States Patent [19]

Schnerk

[11] Patent Number: 4,712,240
[45] Date of Patent: Dec. 8, 1987

[54] TRANSMISSION AND RECEPTION OF TELEVISION BROADCAST IN HIGH-FIDELITY STEREO AUDIO

[75] Inventor: Thomas G. Schnerk, Rancho Palos Verdes, Calif.

[73] Assignee: TRW Inc., Redondo Beach, Calif.

[21] Appl. No.: 878,735

[22] Filed: Mar. 26, 1986

[51] Int. Cl.$^4$ .................... H04H 5/00; H04N 7/04
[52] U.S. Cl. ...................................... 387/3; 358/144; 375/18
[58] Field of Search ................. 375/18; 358/143, 144, 358/145; 381/3

[56] References Cited

U.S. PATENT DOCUMENTS

| | | | |
|---|---|---|---|
| 3,723,637 | 3/1973 | Fujio et al. | 358/145 |
| 3,916,092 | 10/1975 | Justice | 358/145 |
| 4,114,710 | 9/1978 | Katoh | 375/18 |
| 4,266,243 | 5/1981 | Shutterly | 358/145 |
| 4,318,125 | 3/1982 | Shutterly | 358/145 |
| 4,321,623 | 3/1982 | Rzeszewski | 358/145 |
| 4,535,356 | 8/1985 | Nakagawa et al. | 358/142 |
| 4,558,454 | 12/1985 | Hills et al. | 375/18 |

Primary Examiner—Forester W. Isen
Attorney, Agent, or Firm—Noel F. Heal; Sol L. Goldstein

[57] ABSTRACT

A method and apparatus for modulating and demodulating a digitized stereo audio signal with a 3-level, partial response waveform. The 3-level, partial response waveform utilizes 3-level coded pulses rather than conventional on-off or 2-level coded pulses. This results in a bandwidth reduction of approximately 50% over the conventional 2-level coded pulses and allows the stereo audio signal to be transmitted within the bandwidth limitations of conventional television transmission systems, without first compressing or reducing the sampling rate of the stereo audio signal. For transmission over statellite-based systems, the modulated stereo audio signal is digitally up-converted to a 6.6 MHz quadrature subcarrier. For transmission over ground-based systems, the modulated audio signal is multiplexed into the video signal during the video horizontal blanking interval.

6 Claims, 10 Drawing Figures

TRANSMISSION AND RECEPTION OF TELEVISION BROADCAST IN HIGH-FIDELITY STEREO AUDIO

BACKGROUND OF THE INVENTION

This invention relates generally to television transmission and reception systems and, more particularly, to television transmission and reception systems for broadcasts having stereo audio.

Television broadcasts in stereo audio are becoming increasingly popular. Conventional television signals, including an NTSC (National Television System Committee) television signal, typically provide only a single channel for the audio signal. For example, the NTSC audio signal is transmitted on a subcarrier frequency at 4.5 MHz above the video carrier frequency. The 4.5 MHz frequency was selected to minimize interference with the video signal, which has an upper bandwidth of approximately 4.2 MHz above the video carrier frequency. Unfortunately, the audio subcarrier frequency at 4.5 MHz is not sufficiently separated from the video upper bandwidth to easily accommodate the bandwidth required for stereo audio.

Various techniques have been devised for transmitting stereo audio within the bandwidth limitations of the conventional NTSC television signal. These techniques vary depending upon the mode of transmission of the television signal. For ground-based television transmission systems, such as over-the-air or cable transmission systems, the bandwidth of the television signal is generally limited to 4.5 MHz. One technique for transmitting stereo audio within this 4.5 MHz bandwidth limitation is to transmit the stereo audio signal during the video horizontal blanking interval. However, transmitting the stereo audio signal during the video horizontal blanking interval destroys both the video horizontal synchronization signal and the video color burst signal. In addition, the stereo audio signal is frequently digitized to increase the quality of the sound and to allow for encryption of the audio signal, thus preventing unauthorized access to the audio signal. However, the time duration of the horizontal blanking interval is insufficient to transmit a digitized stereo audio signal, unless the digitized audio signal is either compressed or the sampling rate of the audio signal is reduced below the Nyquist sampling rate. Both of these alternatives severely degrade the quality of the stereo sound.

For satellite-based transmission systems, the stereo audio signal is frequently transmitted on two separate subcarrier frequencies, at 5.8 and 7.6 MHz above the video carrier frequency. The left channel of the stereo audio signal is transmitted over one frequency and the right channel of the stereo audio signal is transmitted over the other frequency. The two channels are necessary because the conventional NTSC audio channel at 4.5 MHz interferes with the video signal and, therefore, is generally not transmitted. However, the two satellite channels are typically analog channels and cannot accommodate the bandwidth that is required to transmit a digitized stereo audio signal, without first compressing or reducing the sampling rate of the stereo audio signal.

Accordingly, there has been a long existing need in the broadcasting industry for a method and apparatus for transmitting and receiving high-fidelity digital stereo audio within the bandwidth limitations of conventional television transmission and reception systems. The present invention clearly fulfills this need.

SUMMARY OF THE INVENTION

The present invention resides in a method and apparatus for modulating and demodulating a digitized stereo audio signal such that the stereo audio signal can be transmitted within the bandwidth limitations of conventional television transmission systems, without compressing or reducing the sampling rate of the stereo audio signal. Briefly, and in general terms, the method of the present invention involves modulating the digitized stereo audio signal with a 3-level, partial response waveform. The 3-level, partial response waveform is a binary, pulse modulated code that utilizes 3-level coded pulses rather than conventional on-off or 2-level coded pulses. This results in a bandwidth reduction of approximately 50% over pulse code modulation utilizing on-off or 2-level coded pulses. The method of the present invention also involves modulating the digitized stereo audio signal by reading from a memory amplitude samples of a modulation response waveform stored in the memory.

More specifically, in a presently preferred embodiment of the invention for implementation in satellite-based transmission systems, the left and right channels of an analog stereo audio signal are digitized at a 39.335 KHz sampling rate. The 39.335 KHz sampling rate is 2.5 times the video horizontal line rate of 15.734 KHz and, therefore, five samples of digitized audio are generated during each horizontal line of video. The parallel bit streams of left and right audio samples are then multiplexed and, if desired, encrypted and encoded for error correction.

The serial bit stream of encrypted and error encoded audio samples is then converted into parallel symbol streams of left and right audio samples, with each individual symbol stream being modulated by the 3-level, partial response waveform. The modulated audio samples are digitally up-converted to a 6.6 MHz quadrature subcarrier, for satellite transmission, by multiplexing and complementing the left and right audio samples. Because of the approximate 50% reduction in bandwidth provided by the 3-level, partial response modulation over conventional pulse code modulation utilizing 2-level coded pulses, the 6.6 MHz modulated signal can be easily inserted, with minimum interference, between the conventional satellite channels at 5.8 and 7.6 MHz.

At a television receiver, the original left and right channels of stereo audio are recovered through an RF sampling of the received 6.6 MHz stereo audio signal. The result is a serial bit stream of left and right audio samples, which, if previously encrypted and encoded for error correction, is decrypted and corrected for errors. The serial bit stream of audio samples is then converted into parallel bit streams of left and right audio samples and, after conversion into analog signals, are output to a pair of speakers.

In another presently preferred embodiment of the invention for implementation in ground-based transmission systems, such as over-the-air or cable transmission systems, the audio encoding and decoding steps are essentially the same as those employed in the satellite-based transmission system, with one major exception. Rather than transmitting the two channels of stereo audio continuously over a separate subcarrier frequency, the five modulated left and right audio samples are multiplexed into the video signal during the video horizontal blanking interval. This is necessary because ground-based transmission systems are generally limited to the conventional NTSC 4.5 MHz bandwidth. The 3-level, partial response modulation allows the modulated audio samples to be burst out during the horizontal blanking interval, within the 4.2 MHz video bandwidth, without first compressing or reducing the sampling rate of the stereo audio signal, and without interfering with the NTSC audio channel at 4.5 MHz.

The 3-level, partial response modulation also provides a means for reconstructing the video horizontal synchronization signal and the video color burst signal, which are destroyed when the stereo audio signal is transmitted during the video horizontal blanking interval. Because the 3-level, partial response waveform has an upper level, a lower level and a center level, a random bit stream modulated with the 3-level, partial response waveform has an average center crossing of approximately 50%. If the modulated audio signal is burst out at a rate that is a harmonic of the color burst frequency (3.58 MHz), these center crossings will also occur at the harmonic of the color burst frequency. By timing the crossings, the color burst signal and the horizontal synchronization signal can be easily derived.

It will be appreciated from the foregoing that the present invention provides a method and apparatus for transmitting high fidelity, non-compressed digital stereo audio within the bandwidth limitations of conventional television transmission systems. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENTS

As shown in the drawings for purposes of illustration, the present invention is embodied in a method and apparatus for modulating and demodulating a digitized stereo audio signal such that the stereo audio signal can be transmitted within the bandwidth limitations of conventional television transmission systems, without compressing or reducing the sampling rate of the stereo audio signal. A conventional NTSC television signal provides only a single channel for the audio signal, which is transmitted on a subcarrier frequency at 4.5 MHz above the video carrier frequency. The subcarrier frequency at 4.5 MHz is not sufficiently separated from the video bandwidth to easily accommodate the bandwidth required for stereo audio. Various techniques have been devised for transmitting stereo audio within the bandwidth limitations of the conventional NTSC television signal, but none of these techniques allows a digitized stereo audio signal to be transmitted without first compressing or reducing the sampling rate of the stereo audio signal.

In accordance with the present invention, a digitized stereo audio signal is modulated with a 3-level, partial response waveform. The 3-level, partial response waveform is a binary, pulse modulated code that utilizes 3-level coded pulses rather than conventional on-off or 2-level coded pulses. This results in a bandwidth reduction of approximately 50% over pulse code modulation utilizing on-off or 2-level coded pulses. In a presently preferred embodiment of the invention, for implementation in satellite-based transmission systems, the modulated stereo audio signal is digitally up-converted to a 6.6 MHz quadrature subcarrier frequency. In another presently preferred embodiment of the invention, for implementation in ground-based transmission systems, the modulated audio signal is multiplexed into the video signal during the video horizontal blanking interval.

SATELLITE-BASED TRANSMISSION SYSTEM

Stereo Audio Encoder

Figure 1:
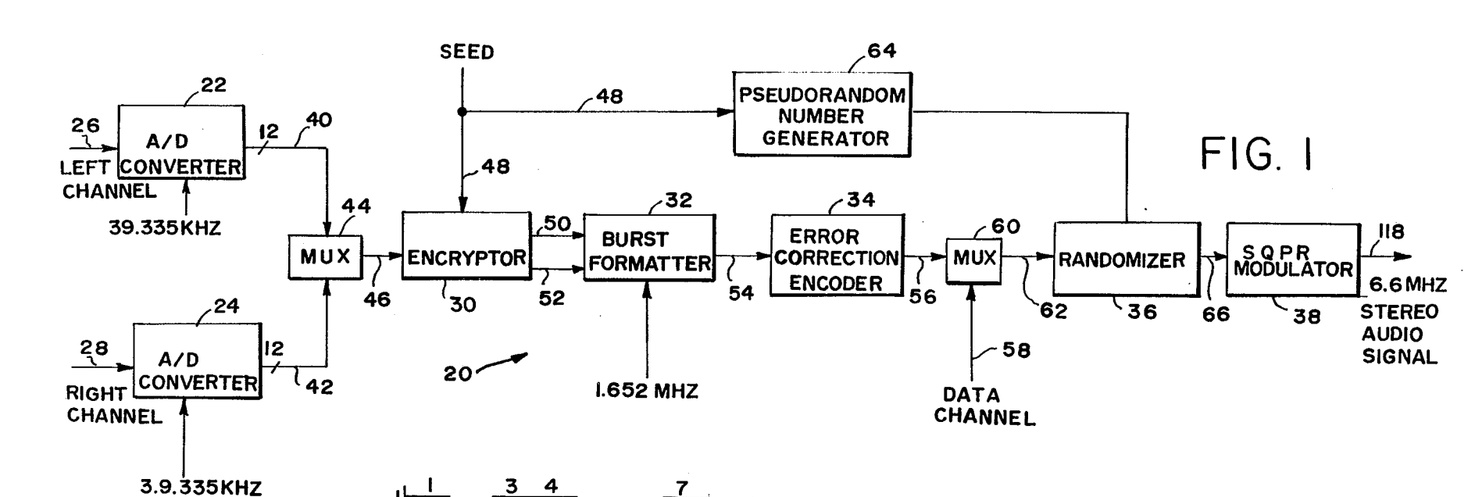
FIG. 1 is a block diagram of a stereo audio encoder illustrating the basic subsystem components, including a staggered quadrature partial response (SQPR) modulator.

FIG. 1 shows a stereo audio encoder 20 for encoding stereo audio to be transmitted over satellite-based transmission systems. The stereo audio encoder 20 includes a pair of analog-to-digital converters 22, 24 that digitize left and right channels of a stereo audio signal, on lines 26, 28, respectively, an encryptor 30 that encrypts the digitized stereo audio signal, thus preventing unauthorized access to the audio signal, a burst formatter 32 that bursts out the digitized stereo audio signal at a higher data rate to allow additional data to be appended to the digitized audio signal, an error correction encoder 34 that encodes the digitized stereo audio signal for error correction, a randomizer 36 that ensures a random bit stream for modulation, and a staggered quadrature partial response (SQPR) modulator 38 that modulates the digitized stereo audio signal with a 3-level, partial response waveform and then digitally up-converts the modulated audio signal to a 6.6 MHz quadrature subcarrier frequency for satellite transmission.

More specifically, the analog-to-digital converters 22, 24 digitize the left and right channels of a stereo audio signal on lines 26, 28, respectively, at a sampling rate of 39.335 KHz and a quantization level of 12 bits. The 39.335 KHz sampling rate is locked to the video signal and is 2.5 times the video horizontal line rate of 15.734 KHz. Therefore, five samples of digitized stereo audio are generated during each horizontal line of video. The outputs of the analog-to-digital converters 22, 24 are parallel bit streams of left and right digitized audio samples, on lines 40, 42, respectively.

The left and right digitized audio samples on lines 40, 42 are multiplexed in a multiplexer 44. The output of the multiplexer 44, on line 46, is a serial bit stream of digitized audio samples at twice the sampling rate of 39.335 KHz, or 78.67 KHz. The serial bit stream of audio samples on line 46 is then encrypted in the encryptor 30. In the presently preferred embodiment of the invention, the serial bit stream of digitized audio samples on line 46 is encrypted in the encryptor 30 by adding each bit of each audio sample to a pseudorandom number generator seed value, on line 48. The outputs of the encryptor 30, parallel bit streams of left and right encrypted audio samples, on lines 50, 52, respectively, are then output to the burst formatter 32. The burst formatter 32 converts the parallel bit streams of left and right encrypted audio samples to a serial bit stream, on line 54, and bursts out the serial bit stream, five samples at a time, at a 1.652 MHz bit rate to allow for the later insertion of a 30 bit data channel.

The serial bit stream of encrypted audio samples on line 54 is encoded for error correction in the error correction encoder 34 by appending 15 parity bits to every five audio samples. The output of the error correction encoder 34 is a 75-bit serial bit stream of encrypted and error-encoded audio samples, on line 56. A 30-bit data channel, on line 58, is then multiplexed in with the serial bit stream on line 56 by a multiplexer 60. The 30-bit data channel, at a data rate of 472 KHz, can be used to transmit any additional digital information. The output of the multiplexer 60, on line 62, is a continuous 105-bit serial stream of data and encrypted and error-encoded audio samples at a bit rate of 1.652 MHz.

The serial bit stream of data and encrypted and error-encoded audio samples on line 62 is randomized by the randomizer 36, prior to modulation, to ensure that the modulation is preformed on a time-varying bit stream. In the presently preferred embodiment of the invention, the serial bit stream is randomized by applying each bit of each audio sample to an exclusive-OR gate with a random bit stream from a pseudorandom number generator 64. The pseudorandom number generator 64 is loaded with the seed value on line 48.

The output of the randomizer 36, a random serial bit stream of data and encrypted and error-encoded audio samples, on line 66, is applied to the staggered quadrature partial response (SQPR) modulator 38. As shown in detail in FIG. 2, the SQPR modulator 38 includes, in parallel, a pair of flip-flops 68, 70 that convert the serial bit stream of data and audio samples on line 66 into parallel in-phase (I) and staggered quadrature-phase (Q) symbol streams, on lines 72, 74, respectively, and a pair of serial-to-parallel shift registers 76, 78 that store and output, on lines 80, 82, the last eight symbol values of the I and Q symbol streams from lines 72, 74, respectively. The SQPR modulator 38 also includes, in parallel, a pair of read-only-memories (ROMs) 84, 86 that output, on lines 88, 90, stored 3-level, partial response waveforms according to the last eight values of the I and Q symbol streams from lines 80, 82, respectively, a multiplexer 92 that combines the partial response waveforms, and a complementor 94 that digitally up-converts the combined partial response waveforms to a subscarrier frequency.

Figure 2:
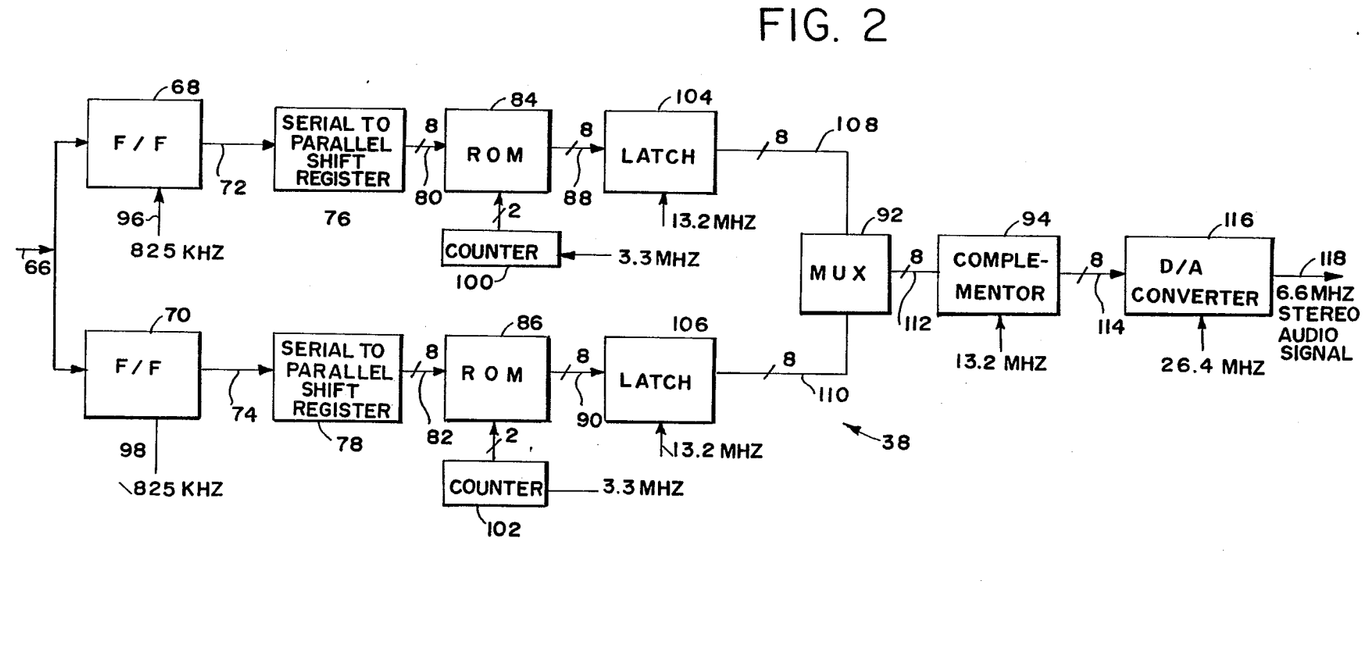
FIG. 2 is a block diagram of the SQPR modulator.
Figure 3A:
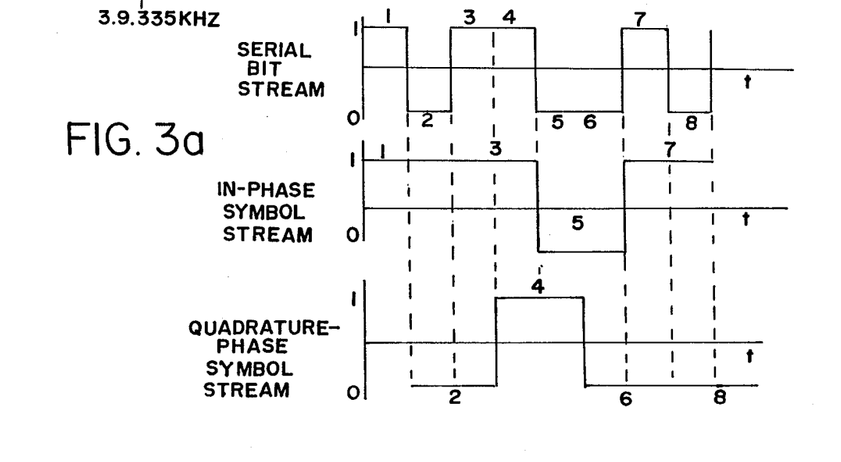
FIGS. 3a-3b are time-versus-amplitude graphs illustrating a serial bit stream of ones and zeroes and the corresponding in-phase and quadrature-phase symbol streams before and after differential encoding.

More specifically, the pair of flip-flops 68, 70 convert the serial bit stream of data and encrypted and error-encoded audio samples on line 66, at a bit rate of 1.652 MHz, into parallel in-phase (I) and staggered quadrature-phase (Q) symbol streams on lines 72, 74, respectively, at a symbol rate of $1/T_s=825$ KHz, or half the incoming bit rate of 1.652 MHz. As illustrated in FIG. 3a, each bit is converted into a symbol having twice the time duration of the bit. The quadrature-phase (Q) symbol stream is offset or staggered by half a symbol in relation to the in-phase (I) symbol stream by delaying the quadrature-phase (Q) symbol stream for one bit, or 90 degrees. Staggering the I and Q symbol streams prevents phase transitions from occurring simultaneously in the two symbol streams, thus reducing the maximum phase transition from 180 to 90 degrees and substantially reducing the amplitude variations in the envelope of the modulated signal.

Figure 3B:
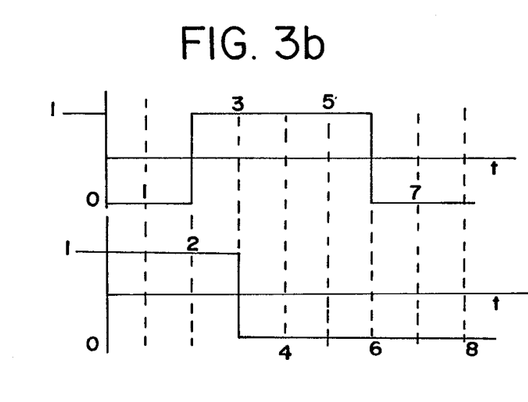

Converting the bit stream of audio samples on line 66 into a pair of staggered symbol streams on lines 72, 74 is achieved by clocking the flip-flop 68 with a 825 KHz clock signal, on line 96, and the flip-flop 70 with a ·825 KHz clock signal, on line 98. The \825 KHz clock signal on line 98 is 180 degrees out of phase with the 825 KHz clock signal on line 96, thus providing the stagger between the two symbol streams. The flip-flops 68, 70 also provide a type of differential encoding of the serial bit stream on line 66. The flip-flops 68, 70 toggle or change state if the input is a one and do not toggle or change state if the input is a zero. FIG. 3b illustrates the effect of this differential encoding on the symbol streams shown in FIG. 3a. Each of the differentially-encoded symbols has a state opposite that of the immediately preceding differentially-encoded symbol when the symbol to be encoded is a one, while each of the differentially-encoded symbols has a state equal that of the immediately preceding differentially-encoded symbol when the symbol to be encoded is a zero. In FIG. 3b, the immediately preceding differentially-encoded symbol for each of the symbols 1 and 2 was arbitrarily chosen as a one.

The serial-to-parallel shift registers 76, 78 store and output on lines 80, 82 the last eight symbol values of the I and Q symbol streams from lines 72, 74, respectively. These eight symbol values represent the most significant eight bits of a ten bit address for each of the ROMs 84, 86. Four eight-bit amplitudes of the 3-level, partial response waveforms are stored in the ROMs 84, 86 for each of the possible 256 combinations of the eight symbols. The four amplitudes correspond to points on the partial response waveforms at every 90 degrees, or at $T_s/4$ seconds. Two bit counters 100, 102, driven by a clock signal at $4/T_s$ Hz, or 3.3 MHz, generate the least significant two bits.

The four eight-bit amplitudes of the 3-level, partial response waveforms are computed for each of the possible 256 eight-symbol combinations of ones and zeroes as follows. The transfer function of a 3-level, partial response waveform is:

$$H(f) = 2T_s \cdot \cos \pi f T_s \text{ for } |f| \leq \tfrac{1}{2}T_s$$

$$= 0 \text{ for } |f| > \tfrac{1}{2}T_s.$$

The transfer function of the 3-level, partial response waveform approximates a rectified cosine wave having a low pass bandwidth of $\tfrac{1}{2}T_s$. The corresponding impulse response of the 3-level, partial response waveform is obtained from the inverse Fourier transform of the transfer function.

$$h(t) = F^{-1}(H(f)) = \sin(\pi t/T_s)/(\pi t/T_s) +$$

$$\sin(\pi(t - T_s)/T_s)/(\pi(t - T_s)/T_s)$$

$$= (4/\pi) \cdot \cos(\pi t/T_s)/(1-4(t/T_s)^2).$$

Figure 4A:
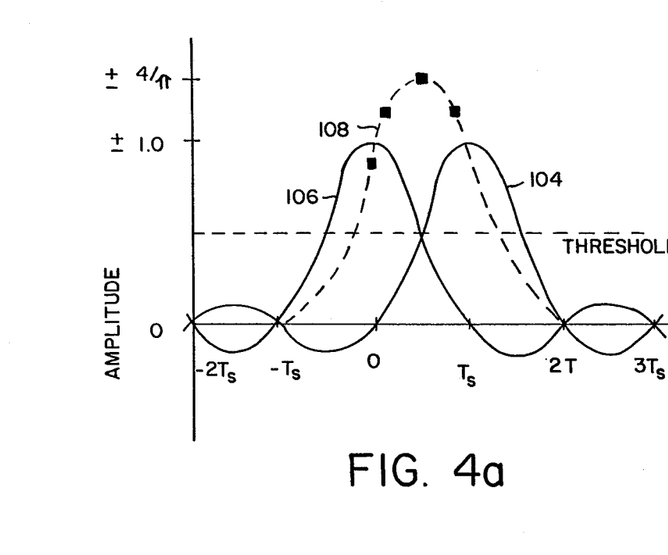
FIGS. 4a-4b are time-versus-amplitude graphs illustrating the impulse response of two partial response waveforms.

Therefore, and as shown in FIG. 4a, the impulse response of the 3-level, partial response waveform h(t), at the sampling instant of $t=0.0\ T_s$ seconds, consists of two sinx/x waves 104, 106. The two sine waves 104, 106 represent symbols, with each symbol having a value of one, at $t=0.0\ T_s$ seconds and $t=+1.0\ T_s$ seconds. Because the sampling interval is $T_s$ seconds, the partial response waveform introduces a controlled amount of intersymbol interference, as the two sinx/x waves combine to form a $\cos x/(1-4x^2)$ wave 108, centered at $t=0.5\ T_s$ seconds.

Figure 4B:
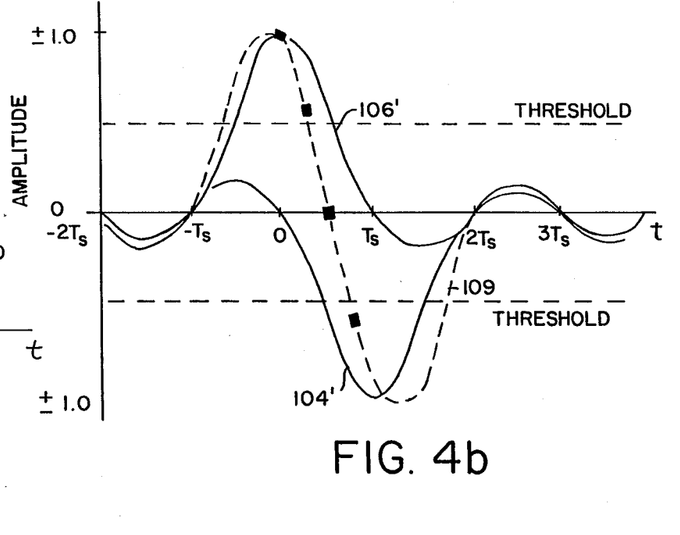

Similarly, the impulse response of the 3-level, partial response waveform h(t) for symbols having a value of zero at $t=0.0\ T_s$ seconds and $t=+1.0\ T_s$ seconds is a negative of the impulse response h(t) for symbols having a value of one at $t=0.0\ T_s$ seconds and $t=+1.0\ T_s$ seconds. This impulse response h(t) consists of two −sinx/x waves 104, 106, which combine to form a $-\cos x/(1-4x^2)$ wave 108 centered at $t=0.5\ T_s$ seconds. FIG. 4b shows the impulse response of the 3-level, partial response waveform h(t) for symbols having values of one and zero at $t=0.0\ T_s$ seconds $t=+1.0\ T_s$ seconds, respectively. The impulse response consists of a +sinx/x wave 106′ and a −sinx/x wave 104′, which combine to form a sinx wave 109 centered at $t=0.5\ T_s$ seconds. Similarly, the impulse response of the 3-level, partial response waveform h(t) for symbols having values of zero and one at $t=0.0\ T_s$ seconds $t=+1.0\ T_s$ seconds, respectively, is a negative of the impulse response h(t) for symbols having values of one and zero at $t=0.0\ T_s$ seconds $t=+1.0\ T_s$ seconds, respectively.

These impulse responses h(t) are the responses of the 3-level, partial response waveform to a single input impulse at the sampling instant of $t=0.0\ T_s$ seconds. However, input impulses at other sampling instants also contribute to the impulse response at the sampling instant of $t=0.0\ T_s$ seconds, with the input impulses at $t=\pm 3.0\ T_s$, $\pm 2.0\ T_s$ and $\pm 1.0\ T_s$ seconds having some non-negligible contribution. Therefore, in the presently preferred embodiment of the invention, the four eight-bit amplitudes of the 3-level, partial response waveforms are computed by summing the seven impulse responses $h(t+3T_s)$, $h(t+2T_s)$, $h(t+1T_s)$, $h(t)$, $h(t-T_s)$, $h(t-2T_s)$ and $h(t-3T_s)$.

Each impulse response is a response to one input impulse, and because each input impulse represents two adjacent symbols, the seven impulse responses are the responses to a total of eight symbols. Therefore, the seven impulse responses must be computed and summed for each of the possible 256 eight-symbol combinations of ones and zeroes. These 256 responses are the 256 3-level, partial response waveforms stored in the ROMs 84, 86. The four eight-bit amplitudes of the 256 responses are stored in the ROMs for the sampling points at $t=0.0\ T_s$, $0.25\ T_s$, $0.5\ T_s$ and $0.75\ T_s$ seconds, or every 90 degrees. Only the four sampling points are needed to adequately represent the 3-level, partial response waveforms. These four sampling points are shown on the sine and cosine waves 108, 109 in FIGS. 4a–4b.

When each of the ROMs 84, 86 is addressed by a synchronous input of eight symbols, at a sampling rate of $1/T_s$, the sampled output has three distinct amplitude levels, $+4/\pi$, 0 and $-4/\pi$. This is the 3-level coded pulse that allows the 3-level, partial response modulation to achieve a bandwidth reduction of approximately 50% over conventional pulse code modulation utilizing on-off or 2-level coded pulses.

The four-sample partial response waveforms are output by the ROMs 84, 86 at a sampling rate of 3.3 MHz and digitally up-converted to a 6.6 MHz quadrature subcarrier, for satellite transmission, by multiplexing and complementing the partial response waveforms. The outputs of the ROMs 84, 86 on lines 88, 90 are first latched into latches 104, 106, respectively. Each of the latches 104, 106 operates at 13.2 MHz and, therefore, outputs four eight-bit samples for each incoming sample of the partial response waveform. These eight-bit samples, output on lines 108, 110, are then multiplexed in the multiplexer 92. The output of the multiplexer 92, on line 112, is a digital stream of alternating eight-bit samples of in-phase (I) and quadrature-phase (Q) partial response waveforms at 26.4 MHz. The digital stream on line 112 is then complemented in the complementor 94 at 13.2 MHz to digitally up-convert the digital stream to the 6.6 MHz quadrature subcarrier frequency, which is output on line 114.

Figure 5:
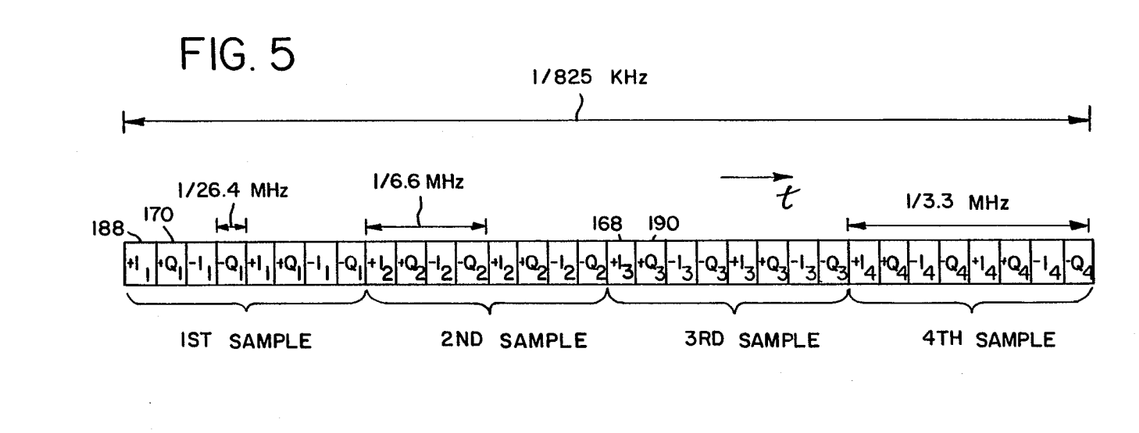
FIG. 5 shows a sequence of in-phase and quadrature-phase symbols after modulation and up-conversion to a subcarrier frequency.

FIG. 5 illustrates the multiplexed and complemented digital stream of I and Q samples output by the complementor 94 on line 114. Each I and Q sample is an eight bit sample having a time duration of 1/26.4 MHz. Four of these I and Q samples are output for each of the four samples of the I and Q partial response waveforms read from the ROMs 84, 86. Therefore, 32 I and Q samples are output by the complementor 94 for every pair of I and Q partial response waveforms read from the ROMs 84, 86. These 32 samples are output at a frequency of 825 KHz. The multiplexing by the multiplexer 92 causes the I and Q samples to be alternated and the complementing by the complementor 94 causes every other I and Q sample pair to be a negative.

Figure 6:
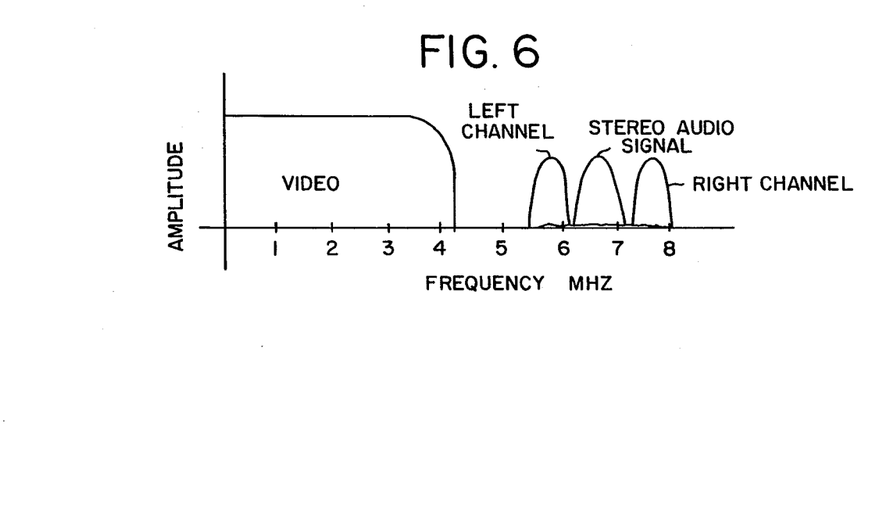
FIG. 6 is a frequency-versus-amplitude graph of an 8 MHz bandwidth video and audio signal.

The output of the complementor 94 on line 114 is converted to an analog signal by a digital-to-analog converter 116. The digital-to-analog converter 116 operates at four times the subcarrier frequency of 6.6 MHz, or 26.4 MHz. The output of the digital-to-analog converter 116 is a 6.6 MHz modulated stereo audio signal, on line 118. Because of the approximate 50% reduction in bandwidth provided by the 3-level, partial response modulation when compared with conventional pulse code modulation utilizing 2-level coded pulses, the 6.6 MHz modulated stereo audio signal on line 118 can be easily inserted, with minimum interference, between the conventional satellite audio channels at 5.8 and 7.6 MHz, as shown in FIG. 6. The audio and video signal, which has a bandwidth of approximately 8 MHz, is then ready for transmission.

STEREO AUDIO DECODER

Figure 7:
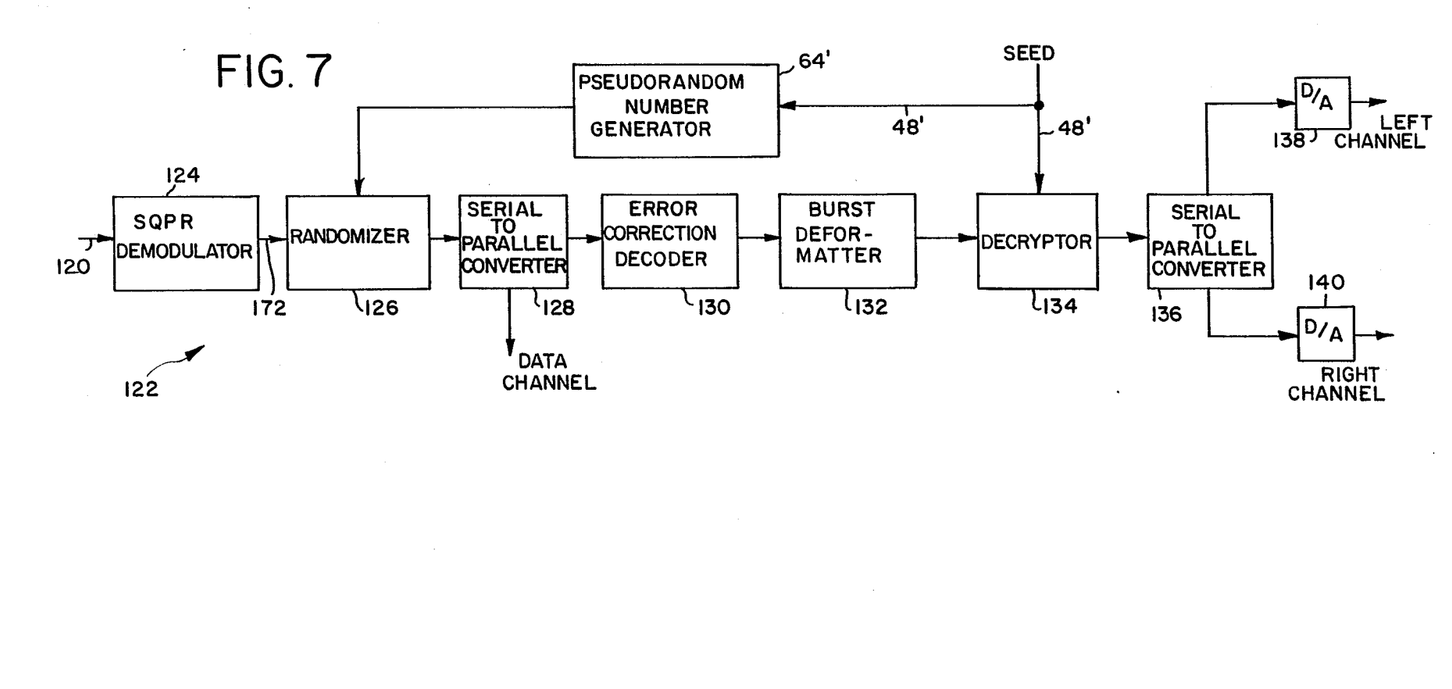
FIG. 7 is a block diagram of a stereo audio decoder illustrating the basic subsystem components, including a staggered quadrature partial response (SQPR) demodulator.

At a television receiver, as shown in FIG. 7, the original left and right stereo audio channels are recovered from a received 8 MHz bandwidth audio and video signal, on line 120, in a stereo audio decoder 122. The stereo audio decoder 122 performs essentially the same functions as the stereo audio encoder 20, only in reverse. The stereo audio decoder 122 includes, in series, a staggered quadrature partial response (SQPR) demodulator 124 that digitizes and demodulates the partial-response modulated audio signal on line 120, a randomizer 126 that removes the randomization applied to the stereo audio signal by the randomizer 36 in the audio encoder 20, a serial-to-parallel converter 128 that removes the 30 bit data channel from the stereo audio signal, and an error correction decoder 130 that corrects any errors introduced into the error-encoded audio signal during transmission and reception.

The stereo audio decoder 122 also includes, in series, a burst deformatter 132 that removes the burst format applied to the stereo audio signal by the burst formatter 32 in the audio encoder 20, a decryptor 134 that decrypts the encrypted audio signal using the same pseudorandom number generator seed value on line 48' as used by the encryptor 30, a parallel-to-serial converter 136 that separates the left and right channels of the stereo audio signal, and a pair of digital-to-analog converters 138, 140 that convert the digitized stereo audio signals into analog signals for output to a pair of speakers.

Figure 8:
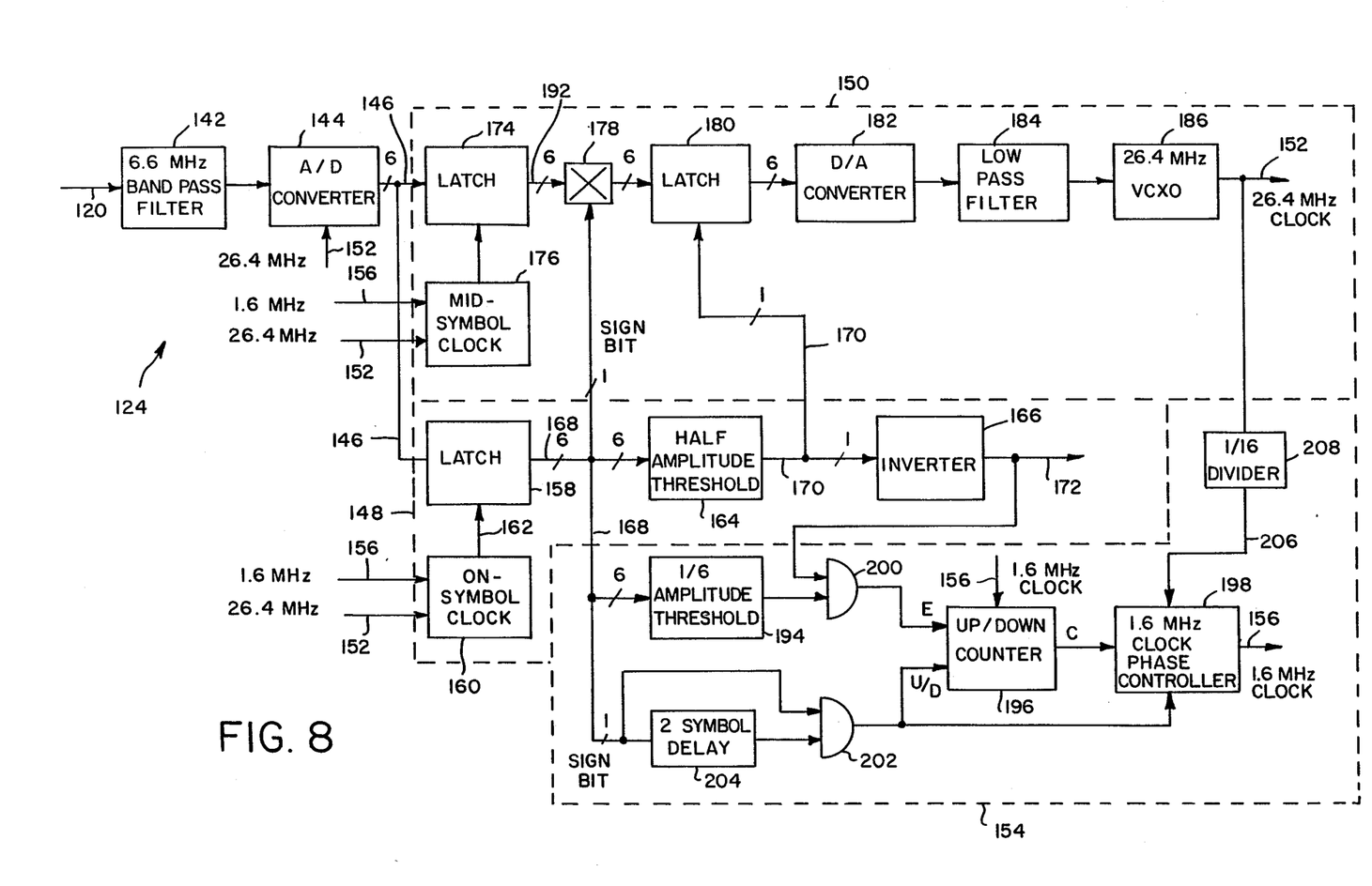
FIG. 8 is a block diagram of the SQPR demodulator.

The SQPR demodulator 124, illustrated in detail in FIG. 8, includes a 6.6 MHz bandpass filter 142 and a six-bit analog-to-digital converter 144. The bandpass filter 142 removes the conventional audio channels and the video signal from the 8 MHz signal on line 120. The analog-to-digital converter 144, operating at 26.4 MHz, digitizes the 3-level, partial-response modulated audio signal. A digitized and modulated audio signal is output by the analog-to-digital converter 144, on line 146. The SQPR demodulator 124 also includes an audio data recovery circuit 148 to recover the stereo audio data from the digitized audio signal on line 146, a carrier recovery servo 150 to generate a 26.4 MHz clock signal, output on line 152, and a symbol clock recovery servo 154 to generate a 1.6 MHz clock signal, output on line 156.

Audio Data Recovery Circuit

The stereo audio data is recovered in the audio data recovery circuit 148 through an RF sampling of the digitized stereo audio signal on line 146. RF sampling is a data recovery method by which the audio data can be recovered directly from the 6.6 MHz quadrature subcarrier frequency signal, without first down-converting the audio signal from the subcarrier frequency. The audio data recovery circuit 146 includes a latch 158 and an on-symbol clock generator 160. The on-symbol clock generator 160, driven by the 26.4 MHz clock signal on line 152 and the 1.6 MHz clock signal on line 156, generates an on-symbol clock signal, output on line 162, that clocks the latch 158. The audio data recovery circuit 148 also includes a half amplitude threshold detector 164 and an inverter 166.

The on-symbol clock signal on line 162 is a 1.6 MHz clock signal having every other clock pulse delayed by 1/26.4 MHz. Clocking the latch 158 with this clock signal causes the latch 158 to output the on-symbol I and Q audio samples from the digitized stereo audio signal on line 146. The on-symbol I and Q audio samples are the third samples of the four-sample, partial response waveforms and contain the original stereo audio information. The on-symbol I and Q audio samples are designated as an $+I_3$ symbol 168 and a $+Q_1$ symbol 170 in FIG. 5. It will be recalled that the I and Q audio samples are offset from each other by 180 degrees of the 825 KHz frequency, or 1.6 MHz, because of the staggering of the I and Q symbols performed by the SQPR modulator 38. The on-symbol I and Q audio samples are output by the latch 158, on line 168, to the half amplitude threshold detector 164.

The original stereo audio information is recovered from the on-symbol I and Q audio samples on line 168 by the half amplitude threshold detector 164 and the inverter 166. The half amplitude threshold detector 164 has a threshold set at $\pm\frac{1}{2}$ of the peak on-symbol amplitude. The threshold detector 164 outputs a one if the on-symbol audio sample has an amplitude that exceeds the plus or minus threshold and outputs a zero if the on-symbol audio sample has an amplitude that does not exceed the threshold. The output of the threshold detector 164, on line 170, is then inverted by the inverter 166. The output of the inverter 166, on line 172, is the original random serial bit stream of data and encrypted and error-encoded audio samples shown in FIG. 3a. The output of the inverter 166 on line 172 is applied to the randomizer 126, as shown in FIG. 7.

The original serial bit stream of audio samples is recovered from the on-symbol I and Q audio samples, with only a simple threshold detector, because of the nature of the differential encoding applied to the symbol stream by the flip-flops 68, 70 and the partial response modulation. It will be recalled that the flip-flops 68, 70 toggle or change state if their input is a one and do not toggle or change state if their input is a zero. The nature of the partial response modulation is that if a state change does occur between two symbols, the amplitude of the on-symbol audio sample will be approximately zero. As shown in FIG. 4b, the third sample, or the on-symbol sample, does not exceed the threshold when the two symbols have different states. Therefore, when the threshold is not exceeded, a symbol having a value of one was transmitted. If a state change does not occur between two symbols, the amplitude of the on-symbol audio sample will exceed the half amplitude threshold. As shown in FIG. 4a, the third sample, or the on-symbol sample, exceeds the threshold when the two symbols have the same state. Therefore, when the threshold is exceeded, a symbol having a value of zero was transmitted. After inversion, these are the original symbol values.

The key to RF sampling and recovering the stereo audio data directly from the 6.6 MHz quadrature subcarrier frequency signal, without first down-converting the audio signal from the subcarrier frequency, is precise reconstruction of the 26.4 MHz and 1.6 MHz clock signals. As will be recalled, these clock signals were used to modulate and up-convert the digitized stereo audio signal for transmission. The carrier recovery servo 150 generates the 26.4 MHz clock signal on line 152 and the symbol clock recovery servo 154 generates the 1.6 MHz clock signal on line 156.

Carrier Recovery Servo

The carrier recovery servo 150 includes, in series, a latch 174 clocked by a mid-symbol clock generator 176, a multiplier 178, a latch 180 clocked by the exceed half amplitude signal on line 170, a digital-to-analog converter 182, a low pass filter 184 and a 26.4 MHz voltage controlled oscillator 186. The mid-symbol clock generator 176 generates a mid-symbol clock signal that is identical to the on-symbol clock signal on line 162, but 180 degrees of the 825 KHz symbol frequency out of phase with the on-symbol clock signal. Clocking the latch 174 with this clock signal causes the latch 174 to output the mid-symbol I and Q audio samples from the digitized stereo audio signal on line 146. The mid-symbol I and Q audio samples are the first samples of the four-sample, partial response waveforms and are designated as an $+I_1$ symbol 188 and a $+Q_3$ symbol 190 in FIG. 5.

The mid-symbol I and Q audio samples are output by the latch 174, on line 192, and then multiplied in multiplier 178 by the sign bits of the on-symbol I and Q audio samples on line 168. Because of the stagger between the I and Q symbol streams, a mid-symbol I audio sample will be multiplied by the sign bit of an on-symbol Q audio sample and a mid-symbol Q audio sample will be multiplied by the sign bit of an on-symbol I audio sample. The output of the multiplier 178 is a measure of the corruption introduced into each of the streams by the other symbol stream. This corruption, or cross correlation between the two symbol streams, results when the RF sampling, which is driven by the 26.4 MHz clock signal, is not properly synchronized with the symbols in the symbol stream.

The cross correlation measurement is output by the latch 180 when the exceed half amplitude signal on line 170 is high. The output of the latch 180 is converted into an analog signal by the digital-to-analog converter 182 and filtered by the low pass filter 184. The output of the low pass filter 184 is applied to the 26.4 MHz voltage controlled oscillator 186, which adjusts the phase of the 26.4 MHz clock signal on line 152 until the cross correlation between the two symbol streams is reduced to approximately zero, thereby synchronizing the RF sampling with the symbols in the symbol stream.

Symbol Clock Recovery Servo

The symbol clock recovery servo 154 includes a 1/6 amplitude threshold detector 194, an up/down counter 196 and a 1.6 MHz clock phase controller 198. The 1/6 amplitude threshold detector 194 has a threshold set at $+/-1/6$ of the peak on-symbol amplitude. The threshold detector 194 outputs a one if the on-symbol audio sample on line 168 has an amplitude that exceeds the plus or minus threshold and outputs a zero if the on-symbol audio sample has an amplitude that does not exceed the threshold. The output of the threshold detector 194 is applied to an AND gate 200 with the inverse of the exceed half amplitude signal, which is on line 172. The output of the AND gate 200 is an enable count signal for the up/down counter 196, which, when set high, allows the counter 196 to count up or down at 1.6 MHz. The counter 196 is enabled when the inverse of the exceed half amplitude signal is high because the symbol clock recovery servo 154 operates by adjusting the phase of the symbol clock signal until the on-symbol zero crossings intersect zero, with some allowance for noise. In the presently preferred embodiment of the invention, the noise value is set at 1/6 amplitude. An on-symbol zero crossing is shown in FIG. 4b as the third sample of the sine wave 109.

When the counter 196 is enabled, the counter will count up or down depending on the output of AND gate 202. The sign bit of an on-symbol audio sample from line 168 is applied to the AND gate 202 with the sign bit of the immediately preceding on-symbol audio sample, stored in a two symbol delay latch 204. The delay latch 204 is a two symbol delay latch in order to gate a present I symbol with the immediately preceding I symbol and a present Q symbol with the immediately preceding Q symbol. If the sign bits of the two symbols are equal, the 1.6 MHz clock signal is causing the sampling by latch 158 to be early, while if the sign bits are not equal, the 1.6 MHz clock signal is causing the sampling by latch 158 to be late.

The phase of the 1.6 MHz clock signal is only adjusted, however, if the clock signal is early or late a specified number of times. The number of counts required to overflow the counter 194 determines this number. If the counter 196 overflows, or outputs a carry bit, the 1.6 MHz clock signal is advanced or retarded according to the early or late designation output by the AND gate 202. The 1.6 MHz clock signal on line 156 is advanced or retarded by adjusting the phase of a 1.6 MHz clock signal on line 206. The 1.6 MHz clock signal on line 206 is generated by dividing the 26.4 MHz clock signal on line 152 by 16 in a 1/16 divider 208. The phase of the 1.6 MHz clock signal on line 206 is adjusted 45 degrees, or $\frac{1}{8}$ of the 26.4 MHz clock frequency, by the clock phase controller 198 each time the counter 196 overflows.

Ground-Based Transmission System

In another presently preferred embodiment of the invention for implementation in ground-based transmission systems, such as over-the-air or cable transmission systems, the audio encoding and decoding steps are essentially the same as those employed in the satellite-based transmission system, with one major exception. Rather than transmitting the two channels of stereo audio continuously over a separate subcarrier frequency, the five modulated left and right audio samples are multiplexed into the video signal during the video horizontal blanking interval. This is necessary because ground-based transmission systems are generally limited to the conventional NTSC 4.5 MHz bandwidth. The 3-level, partial response modulation allows the modulated audio samples to be burst out during the horizontal blanking interval, within the 4.2 MHz video bandwidth, without first compressing or reducing the sampling rate of the stereo audio signal, and without interfering with the NTSC audio channel at 4.5 MHz.

More specifically, in an SQPR modulator for use with ground-based transmission systems, the serial bit stream of encrypted and error-encoded audio samples does not include a data channel and is not converted into parallel I and Q symbol streams before being modulated, but is applied to a single flip-flop, shift register and ROM. Furthermore, the output of the ROM is not digitally up-converted to a subcarrier frequency, but is burst out at 7.16 MHz for 10 microseconds during the horizontal blanking interval.

The 3-level, partial response modulation also provides a means for reconstructing the video horizontal synchronization signal and the video color burst signal, which are destroyed when the stereo audio signal is burst out during the video horizontal blanking interval. If the modulated audio signal is burst out at a rate that is a harmonic of the color burst frequency (3.58 MHz), such as 7.16 MHz, the symbol clock recovery servo will recover the 7.16 MHz clock signal rather than the 1.6 MHz clock signal. The color burst signal and the horizontal synchronization signal can be easily derived from the 7.16 MHz clock signal.

The several preferred embodiments have been shown and described in great detail, including, for example, specific frequencies, threshold values and quantization levels. It is to be understood, however, that these values are merely presented by way of example and should not in any way limit the scope of the invention.

From the foregoing, it will be appreciated that the present invention provides a method and apparatus for transmitting high fidelity, non-compressed digital stereo audio within the bandwidth limitations of conventional television transmission systems. Although several preferred embodiments of the invention have been shown and described, it will be apparent that other adaptations and modifications can be made without departing from the spirit and scope of the invention. Accordingly, the invention is not to be limited, except as by the following claims.

I claim:

1. A method for transmitting a stereo audio signal within the bandwidth limitations of conventional television transmission systems, comprising the steps of:
   digitizing the left and right channels of the stereo audio signal at a sampling rate of approximately 39.335 KHz to generate five audio samples during each horizontal line of a video signal;
   multiplexing the left and right digitized audio samples to form a serial bit stream of audio samples;
   encrypting the serial bit stream of audio samples;
   bursting out the serial bit stream of audio samples at a higher data rate to allow for the insertion of other data into the serial bit stream;
   encoding the serial bit stream of audio samples for error correction;
   randomizing the serial bit stream of audio samples;
   modulating the serial bit stream of audio samples with a 3-level, partial response waveform to form a modulated stereo audio signal; and
   transmitting the modulated stereo audio signal.

2. The method for transmitting a stereo audio signal as set forth in claim 1, wherein the step of encoding the audio samples for error correction includes the step of:
   appending 15 parity bits to every five audio samples.

3. Apparatus for transmitting a stereo audio signal within the bandwidth limitations of conventional television transmission systems, comprising:
   a pair of analog-to-digital converters for digitizing the left and right channels of the stereo audio signal at a sampling rate of approximately 39.335 KHz to generate five audio samples during each horizontal line of a video signal;
   means for multiplexing the left and right digitized audio samples to form a serial bit stream of audio samples;
   a 3-level, partial response modulator for modulating the serial bit stream of audio samples with a 3-level, partial response waveform to form a modulated stereo audio signal;
   means for up-converting the modulated stereo audio signal to a video subcarrier frequency, the up-converting means including means for digitally complementing the modulated audio signal; and
   means for transmitting the modulated stereo audio signal;
   wherein the modulator includes:
   a pair of flip-flops for converting the serial bit stream of audio samples into parallel in-phase and staggered quadrature-phase symbol streams and for differentially encoding each symbol in each of the in-phase and staggered quadrature-phase symbol streams with a state opposite that of the immediately preceding differentially-encoded symbol when the symbol is a one and with a state equal that of the immediately preceding differentially-encoded symbol when the symbol is a zero;
   memory means for storing amplitude samples from a plurality of 3-level, partial response waveforms, the memory means being addressed by a plurality of symbols from the in-phase and the staggered quadrature-phase symbol steams, the memory means including a read-only-memory for storing four amplitude samples for each of 256 3-level, partial response waveforms, the read-only-memory being addressed by the last eight symbols from the in-phase and the staggered quadrature-phase symbol streams; and
   means for multiplexing the in-phase and staggered quadrature-phase partial response amplitude samples.

4. Apparatus for transmitting a stereo audio signal within the bandwidth limitations of conventional television transmission systems, comprising:
   a pair of analog-to-digital converters for digitizing the left and right channels of the stereo audio signal at a sampling rate of approximately 39.335 KHz to generate five audio samples during each horizontal line of a video signal;
   means for multiplexing the left and right digitized audio samples to form a serial bit stream of audio samples;
   a 3-level, partial response modulator for modulating the serial bit stream of audio samples with a 3-level, partial response waveform to form a modulated stereo audio signal, the modulator including a read-only-memory for storing four amplitude samples for each of 256 3-level, partial response waveforms, the read-only memory being addressed by the last eight bits from the serial bit stream;
   means for multiplexing the modulated stereo audio signal into the horizontal blanking interval of a video signal, the multiplexing means including means for bursting out the modulated stereo audio signal at a bit rate of approximately 7.16 MHz; and
   means for transmitting the modulated stereo audio signal.

5. Apparatus for transmitting a stereo audio signal within the bandwidth limitations of conventional television transmission systems, comprising:
   a pair of analog-to-digital converters for digitizing the left and right channels of the stereo audio signal at a sampling rate of approximately 39.335 KHz to generate five audio samples during each horizontal line of a video signal;
   means for multiplexing the left and right digitized audio samples to form a serial bit stream of audio samples;
   means for encrypting the serial bit stream of audio samples;
   means for bursting out the serial bit stream of audio samples at a higher data rate to allow for the insertion of other data into the serial bit stream;
   means for encoding the serial bit stream of audio samples for error correction;
   means for randomizing the serial bit stream of audio samples;
   a 3-level, partial response modulator for modulating the serial bit stream of audio samples with a 3-level, partial response waveform to form a modulated stereo audio signal; and
   means for transmitting the modulated stereo audio signal.

6. The apparatus for transmitting a stereo audio signal as set forth in claim 5, wherein the means for encoding the audio samples for error correction includes;
   means for appending 15 parity bits to every five audio samples.

* * * * *